(12) United States Patent
Hein et al.

(10) Patent No.: US 10,619,535 B2
(45) Date of Patent: Apr. 14, 2020

(54) ARRANGEMENT FOR REMOVING BLOW-BY GASES FROM A CRANKCASE OF AN INTERNAL COMBUSTION ENGINE

(71) Applicant: VOLKSWAGEN AKTIENGESELLSCHAFT, Wolfsburg (DE)

(72) Inventors: Thomas Hein, Quedlinburg (DE); Andre Badstuebner, Kirchberg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/207,569

(22) Filed: Dec. 3, 2018

(65) Prior Publication Data
US 2019/0170032 A1 Jun. 6, 2019

(30) Foreign Application Priority Data
Dec. 1, 2017 (DE) .................. 10 2017 221 735

(51) Int. Cl.
*F02D 41/22* (2006.01)
*F16L 39/00* (2006.01)
(Continued)

(52) U.S. Cl.
CPC .......... *F01M 13/022* (2013.01); *F01M 11/10* (2013.01); *F01M 13/04* (2013.01);
(Continued)

(58) Field of Classification Search
CPC .............. F01P 2031/18; F16L 2201/10; F16L 2201/30; F16L 39/005; F16L 39/02;
(Continued)

(56) References Cited

U.S. PATENT DOCUMENTS 2,155,602 A * 4/1939 Keulers ................. G01M 3/022
138/90
8,261,548 B2 9/2012 Ofner
(Continued)

FOREIGN PATENT DOCUMENTS

DE 10310182 A1 11/2004
DE 102004063459 A1 7/2006
(Continued)

OTHER PUBLICATIONS

English machine translation provided by Espacenet of DE-102016005972-A1 (Year: 2019).*

*Primary Examiner* — Jacob M Amick
*Assistant Examiner* — Michael A Kessler
(74) *Attorney, Agent, or Firm* — Muncy, Geissler, Olds & Lowe, P.C.

(57) ABSTRACT

An arrangement for removing blow-by gases from a crankcase of an internal combustion engine, the blow-by gases being able to be supplied to an air intake system via a tube device, the tube device being connected or connectable to a component assigned to the air intake system and to a component which is in fluid connection to the crankcase. The tube device including a blow-by conduit. The risk of a leaking or incorrectly mounted tube device is avoided in that the tube device has a diagnostic conduit, a spurious air flow being detectable via the diagnostic conduit when the tube device is not tightly connected or is not connected.

8 Claims, 3 Drawing Sheets

(51) Int. Cl.
  *F02M 35/10* (2006.01)
  *F01M 11/10* (2006.01)
  *F02M 25/06* (2016.01)
  *F01M 13/02* (2006.01)
  *F16L 39/02* (2006.01)
  *F01M 13/04* (2006.01)

(52) U.S. Cl.
  CPC ............ *F02D 41/22* (2013.01); *F02M 25/06* (2013.01); *F02M 35/10144* (2013.01); *F02M 35/10222* (2013.01); *F16L 39/00* (2013.01); *F16L 39/005* (2013.01); *F16L 39/02* (2013.01); *F01M 2013/0488* (2013.01); *F01M 2250/60* (2013.01); *F02D 2250/08* (2013.01); *F16L 2201/30* (2013.01)

(58) Field of Classification Search
  CPC ....... F16L 9/18–20; F17D 5/04; F02M 25/06; F02M 25/0809; F02M 25/082; F02M 25/96; F02M 35/04; F02M 35/044; F02M 35/06; F02M 35/10144; F02M 35/10222; F02M 35/10209; F01M 11/10; F01M 2013/0488; F02B 77/08; G01M 3/28; G01M 3/283; G01M 3/2853; F02D 41/14; F02D 41/22; F02D 2250/08
  USPC .......................................... 73/49.1
  See application file for complete search history.

(56) References Cited

U.S. PATENT DOCUMENTS

| | | | |
|---|---|---|---|
| 2002/0036015 A1* | 3/2002 | Miyajima | ........... F02M 25/0872 137/543.23 |
| 2002/0058436 A1* | 5/2002 | Saba | ................ F02M 35/10222 439/191 |
| 2005/0166666 A1 | 8/2005 | Tsukagoshi | |
| 2009/0072535 A1 | 3/2009 | Baumann et al. | |
| 2012/0049509 A1* | 3/2012 | Lininger | ................... F16L 9/06 285/93 |
| 2014/0306448 A1 | 10/2014 | Rivest | |
| 2017/0254465 A1* | 9/2017 | Okazaki | ................. F01M 13/00 |

FOREIGN PATENT DOCUMENTS

| | | | | |
|---|---|---|---|---|
| DE | 102005030457 A1 | | 1/2007 | |
| DE | 102007017668 A1 | | 10/2008 | |
| DE | 102015009505 A1 | * | 1/2017 | ............. F01M 13/02 |
| DE | 10 2016 005 972 A1 | | 2/2017 | |
| DE | 102016005972 A1 | * | 2/2017 | ............. F01M 13/00 |
| DE | 102016015299 A1 | * | 6/2018 | ............. F01M 13/00 |
| DE | 102017002501 A1 | | 9/2018 | |
| EP | 2012052 A1 | | 1/2009 | |
| GB | 724288 A | * | 2/1955 | ......... F02M 25/0872 |
| WO | WO02103236 A1 | | 12/2002 | |
| WO | WO2007000125 A1 | | 1/2007 | |

* cited by examiner

ARRANGEMENT FOR REMOVING BLOW-BY GASES FROM A CRANKCASE OF AN INTERNAL COMBUSTION ENGINE

This nonprovisional application claims priority under 35 U.S.C. § 119(a) to German Patent Application No. 10 2017 221 735.9, which was filed in Germany on Dec. 1, 2017, and which is herein incorporated by reference.

BACKGROUND OF THE INVENTION

Field of the Invention

The present invention relates to an arrangement for removing blow-by gases from a crankcase of an internal combustion engine.

Description of the Background Art

During an operation of an internal combustion engine, blow-by gases enter a crankcase of the internal combustion engine due to unavoidable leaks between the piston and the cylinder. To prevent an impermissibly high pressure from arising in the crankcase, the blow-by gases are discharged with the aid of a tube device. The blow-by gases are conducted to the air intake system to avoid environmental contamination due to the pollutant-laden blow-by gases. The blow-by gases may thus be returned to the combustion process in the internal combustion engine. The tube device includes a blow-by conduit for this purpose.

Different possibilities are now known according to the prior art for connecting the tube device to the corresponding components.

An arrangement is known from DE 10 2004 063 459 A1, in which a tube is connected to a conduit of the air intake system via a connecting piece. For this purpose, the tube is attached directly to the inlet section of the connecting piece with the aid of an outlet section. To secure the connection, at least one window-like side opening is present in the outlet section, with which a barbed hook formed on the inlet section engages. The tube is formed by shaping and/or material selection, at least on its outlet section, in such a way that it is reversibly deformed when attached to the inlet section of the connecting piece. The at least one side opening is designed as an elongated hole, which extends over 30° to 45° in the circumferential direction. The connecting piece is designed with two annular grooves on its inlet section. A sealing ring is inserted into each of these annular grooves. The tube is designed as a corrugated tube.

An arrangement is known from WO 2007/000125 A1, which corresponds to US 2009/0072535, for removing blow-by gases from a crankcase of an internal combustion engine. This arrangement comprises a coupling system for connecting a tube to a socket. The tube has a connecting piece on its ends, which is insertable into the socket and which has at least one annular groove and a fastening contour on its outside. The socket has a locking contour on its outside. A coupling element manufactured separately from the socket and connecting piece is provided, which is mounted on the outside of the connecting piece, the coupling element including multiple locking hooks, which engage the locking contour from behind. The coupling element includes at least one fastening hook, which interacts with the fastening contour to axially fix the coupling element on the connecting piece. The tube may be formed together with the particular connecting piece as a blow-molded part. Each of the locking hooks is provided with a release lever. The particular locking hook may be disengaged from the locking contour by actuating the release lever. The release lever forms an extension of the particular locking hook. An area of a base ring acts as a pivot bearing for the locking hooks extended by the release lever.

The generic arrangement does not yet have an optimum design. Although the connection of the tubes has been simplified, it is nevertheless desirable to reliably avoid leaking or incorrectly mounted tube arrangements.

SUMMARY OF THE INVENTION

It is therefore an object of the present invention to avoid the risk of a leaking or an incorrectly mounted tube devices.

This object of the invention is achieved by an arrangement according to an exemplary embodiment of the invention, which includes a tube device having a diagnostic conduit, a spurious air flow being detectable via the diagnostic conduit if the tube device is leaking or is not tightly connected or is not connected. This has the advantage that the operation of the tube device is reliably ensured for ventilation purposes. If the tube device is correctly mounted and the tube device itself is not leaking, no spurious air flow passes over the diagnostic conduit. However, if the tube device is leaking, incorrectly connected or not connected at all, a spurious air flow passes over the diagnostic conduit and is detected with the aid of a pressure sensor. The spurious air flow leads to the air intake system, in particular to the intake manifold.

If the tube device is correctly mounted and tight, a free, open end of the diagnostic conduit abuts a component in a sealing manner. The outer casing is fastened to the turbocharger housing as a blind, sealed end. A sealing ring is preferably disposed between the end face of the coupling part, which forms the end of the diagnostic conduit, and the component to ensure the tightness of the connection.

The tube device can have a tube-in-tube construction. For this purpose, the tube device comprises an inner tube and an outer tube, the inner tube being disposed within the outer tube. The blow-by gases are now removed through the inner tube. The inner tube is thus used as a blow-by conduit. During a full-load operation, blow-by gases are transported out of the oil separator into the fresh air tract. During a full load, the exhaust gas turbocharger ensures a high pressure buildup, and an elevated pressure prevails in the intake manifold. During a partial load of the internal combustion engine, an underpressure arises in the intake manifold, and the turbocharger delivers only a slight or no pressure buildup. Fresh air is transported from the intake tract, namely from the turbocharger, to the intake manifold via the blow-by conduit. In particular, an annular space, which now serves as the diagnostic conduit, remains between the inner tube and the outer tube. If the inner tube leaks, a spurious air flow, in turn, arises in the diagnostic conduit, i.e. in the annular space between the inner tube and the outer tube. This arrangement takes up only a small amount of installation space. The outer tube and/or the inner tube can be designed as a corrugated tube.

The tube device can have a coupling part, the inner tube engaging on a first outer circumferential surface of the coupling part, and the outer tube engaging with a second outer circumferential surface, an inlet opening emptying into an outer conduit in the coupling part, the outer conduit being used as the diagnostic conduit.

The tube device can be connectable to an oil separator housing on one side, the oil separator housing being in fluid connection with an intake manifold, and the oil separator housing having a diagnostic channel which is in fluid connection with the diagnostic conduit. A pressure fluctuation in the diagnostic channel is detectable with the aid of a pressure sensor. The spurious air flow is guided into the intake manifold, where it is detected with the aid of a pressure sensor. In the case of incorrect mounting on the turbocharger, a damaged outer tube and incorrect mounting on the intake manifold, an opening to the outside air is created, whereby the intake manifold may suck in air. This spurious air is detected via a charge cycle regulation of the internal combustion engine, whereupon an error is detected and output.

The coupling part can represent the connection between the inner tube and the outer tube and, for example, the connecting piece. The coupling part has a first outer circumferential surface, to which the inner tube is attached. The coupling part has a second outer circumferential surface, to which the outer tube is attached. For this purpose, the coupling part may be have an essentially tubular design. The blow-by gases may now be conducted out of the inner tube through this inner conduit. The coupling part can also have an outer conduit, which extends, in particular, at least partially within a lateral surface of the coupling part. The spurious flow in the diagnostic conduit may be conducted to the diagnostic channel through this outer conduit. This outer conduit has at least one opening on an outer circumferential surface, which is limited by an inner circumferential surface of the connecting piece in the inserted state. This inner chamber can be limited by two seals disposed on the outer circumference of the inner part, in particular corresponding 0 rings.

A particularly easy-to-mount connection is provided in that the coupling part is connectable to a connecting piece with the aid of a locking connection.

The locking connection may be formed in an easy-to-manufacture manner in that at least one locking tab is formed on the outer ring, the at least one locking tab interacting with a holding contour formed on the outer circumferential surface of the connecting piece.

The tube device can be connectable to an oil separator housing on one side, the oil separator housing having a diagnostic channel which is in fluid connection with the intake manifold and the diagnostic conduit. The spurious air flow is conducted to the intake manifold via this diagnostic channel. A corresponding sensor may be disposed in the intake manifold, which detects the spurious air flow. The sensor may be designed as a pressure sensor.

The one component, for example, the oil separator, includes a connecting piece. The tube device has a coupling part at each end. In one preferred embodiment, a corresponding coupling part is disposed on each end, the coupling parts not being required to have the same design.

The coupling part may itself have a two-part or multi-part design. These two or multiple parts may be connected to each other by a welded connection, an adhesive connection, a plug connection or the like to achieve a preferably tight connection. The connecting piece and the coupling part are preferably connected to each other via a locking connection. The locking connection is designed, in particular, to be able to be opened. For this purpose the coupling part may have a ring which encompasses the connecting piece on the outside, the ring interacting with the outer surface of the connecting piece via a locking connection. The ring may have corresponding locking tabs for this purpose, which engage on a locking contour on the outer circumferential surface of the connecting piece in the mounted state. This represent a particularly easy-to-handle connection.

The tube device may be connected to the corresponding components with the aid of a screw connection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
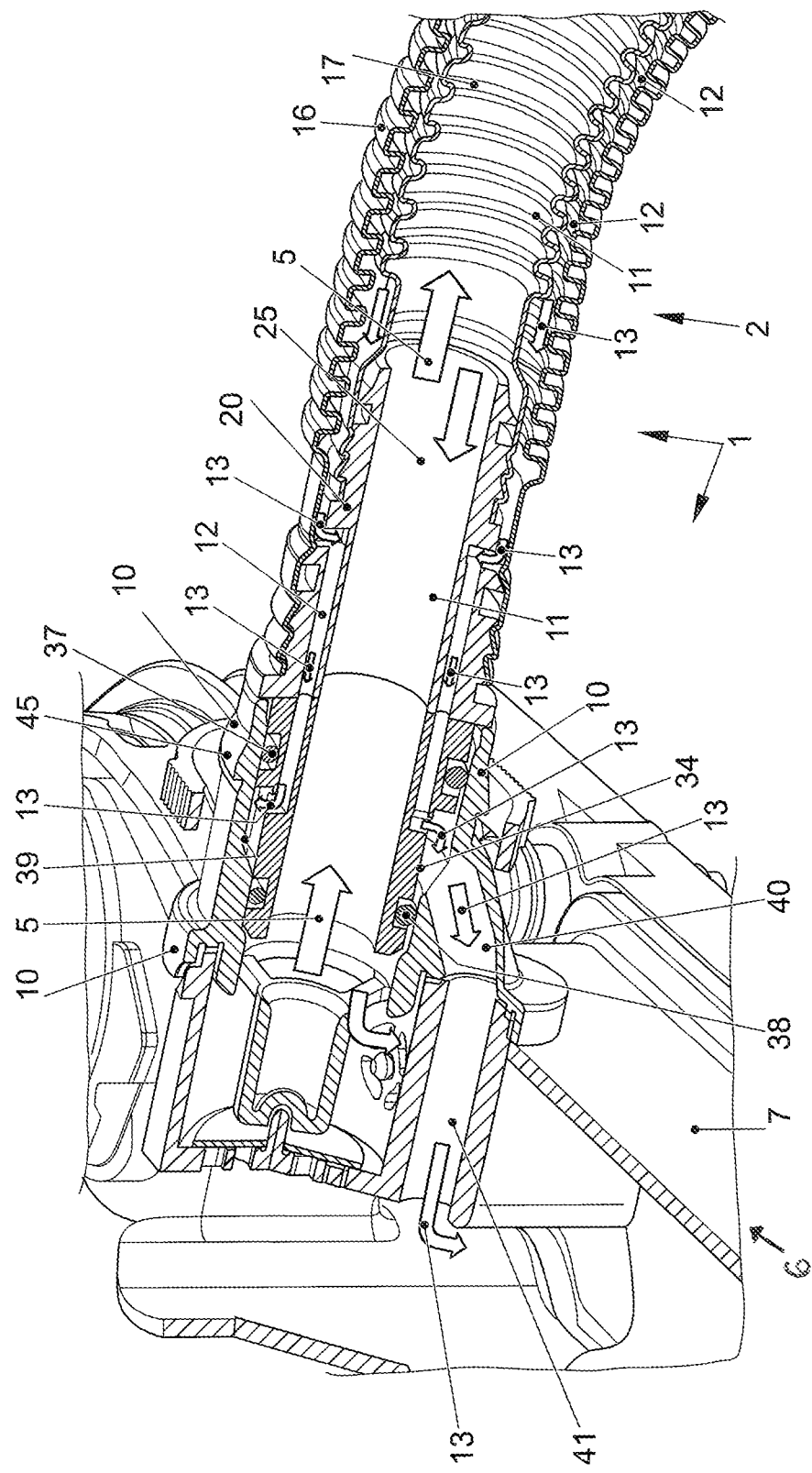
FIG. 1 shows a schematic sectional view of one end of a tube device, which is connected to an oil separator.
Figure 2:
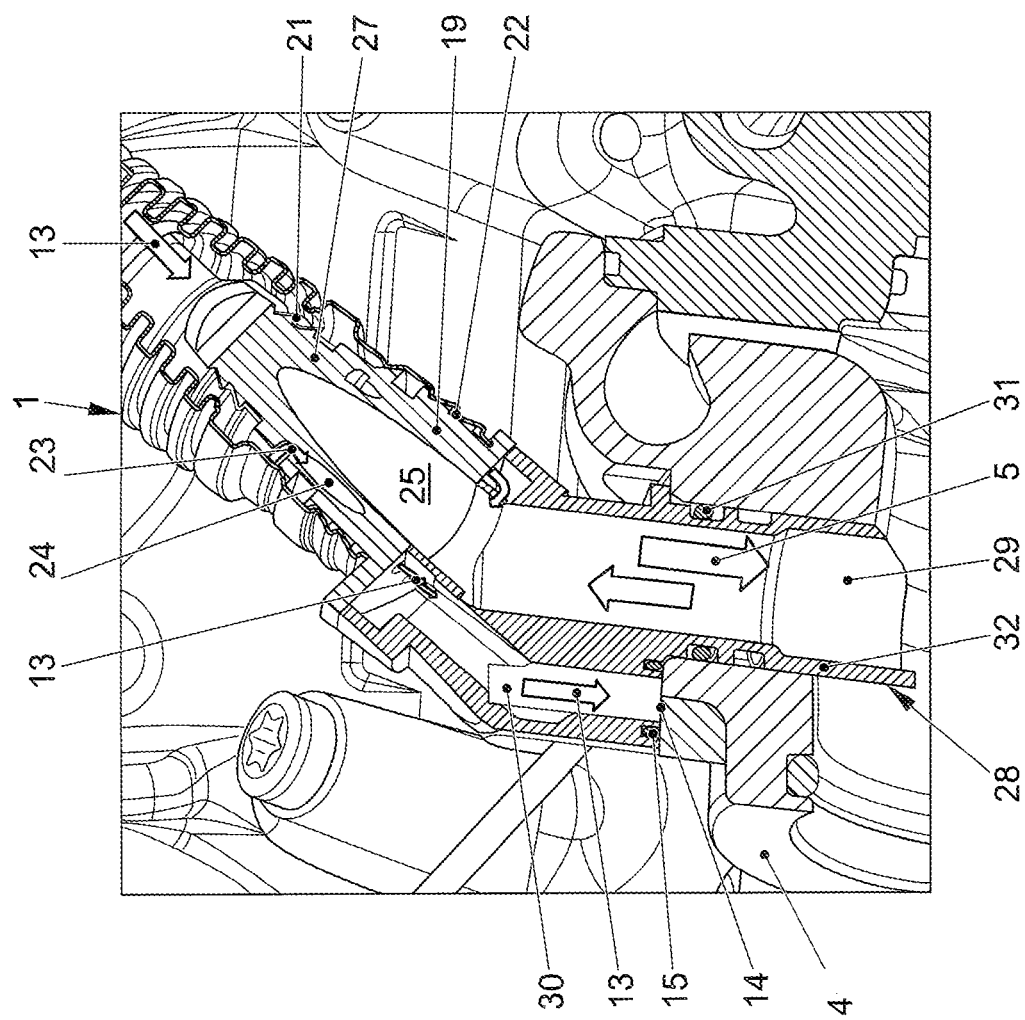
FIG. 2 shows another schematic sectional view of another part of the tube device, which is connected to a turbocharger housing.
Figure 3:
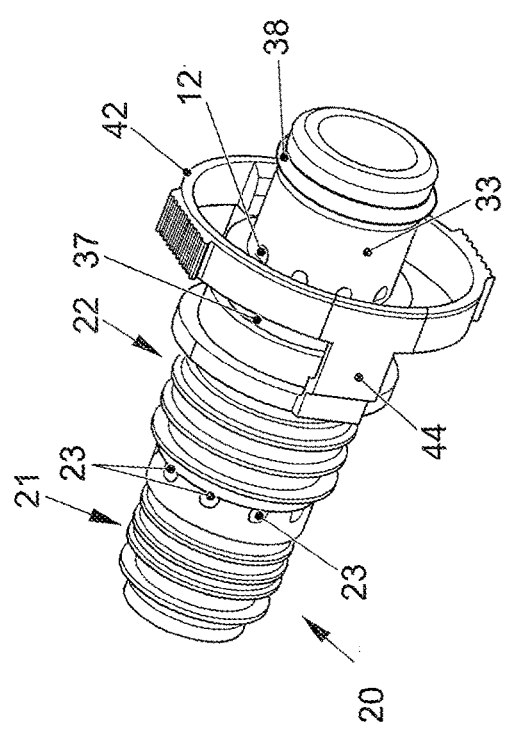
FIG. 3 shows a schematic perspective view of a coupling part of the tube device, which is used for connection to a connecting piece of the oil separator housing.

An arrangement 1 for removing blow-by gases 5 from a crankcase of an internal combustion engine, which is not illustrated, is readily apparent in FIG. 1 through 4. Blow-by gases 5 may be supplied to an air intake system 3 via a tube device 2. Only one part of an exhaust gas turbocharger housing 4 is shown here. Corresponding blow-by gases 5 (indicated here by corresponding arrows) are conducted from an oil separator 6, through tube device 2 to the compressor side of the exhaust gas turbocharger. Of oil separator 6, corresponding oil separator housing 7, in particular, is illustrated here. Oil separator 6 is in fluid connection with the crankcase. Tube device 2 is connected, on the one hand, to a component assigned to the air intake system, namely to exhaust gas turbocharger housing 4, and, on the other hand, to a component which is in fluid connection with the crankcase, namely a connecting piece 10 in this case. Connecting piece 10 is mounted on oil separator housing 7. Tube device 2 now includes a blow-by conduit 11.

The disadvantages mentioned at the outset are now avoided in that tube device 2 has a diagnostic conduit 12, a spurious air flow 13 being detectable via diagnostic conduit 12 when tube device 2 is leaking, is not tightly connected or is not connected at all. Spurious air flow 13, in turn, is indicated here by corresponding arrows. When tube device 2 is correctly mounted, diagnostic conduit 12 has a blind end at an end face 14 of exhaust gas turbocharger housing 4. In particular, a sealing ring 15 is disposed here between the end faces of the opening of diagnostic conduit 12 and exhaust gas turbocharger 4 and end face 14, respectively.

The tube device 2 includes an outer tube 16 and an inner tube 17. Inner tube 17 is used as a blow-by conduit, i.e. blow-by gases 5 are conducted within inner tube 17. Outer tube 16 has a larger diameter than inner tube 17. An annular space remains between outer tube 16 and inner tube 17, which forms part of diagnostic conduit 12.

Tube device 2 includes two coupling parts 19, 20. On the tube side, i.e. in the direction of outer tube 16 and inner tube 17, coupling parts 19, 20 have a first outer circumferential surface 21, to which inner tube 17 is attached. Coupling parts 19, 20 have a second outer circumferential surface 22, to which outer tube 16 is attached. At least one inlet opening 23, in particular multiple inlet openings 23, is/are formed between first outer circumferential surface 21 and second outer circumferential surface 22, which empty into an outer conduit 24. Outer conduit 24 forms part of diagnostic conduit 12.

Coupling parts 19, 20 have a tubular design and conduct the blow-by gases in their interior, i.e. in corresponding cylindrical cavity 25. Cavity 25 thus forms part of blow-by conduit 11. This first area of coupling parts 19, 20 may be formed by a first component 26 and 27, respectively. To connect tube device 2 to air intake system 3, or to exhaust gas turbocharger housing 4, a component 28, which in this case now has an in particular offset design and which is connected to component 27, for example welded thereto or connected by an adhesive connection or a joint connection. Component 28 now has a channel 29 for the blow-by gases and a channel 30, which forms part of diagnostic conduit 12. Channel 30 ends on the end face of exhaust gas turbocharger housing 4, where it is disposed together with sealing ring 15 in a sealing manner. Channel 30 extends a short distance farther into exhaust gas turbocharger 4, where it is disposed on the outer circumferential surface in a sealing manner with the aid of a sealing ring 31. A corresponding tubular edge area 32 limits channel 30. Sealing ring 31 abuts the outer circumferential surface of tubular wall area 32.

Figure 4:
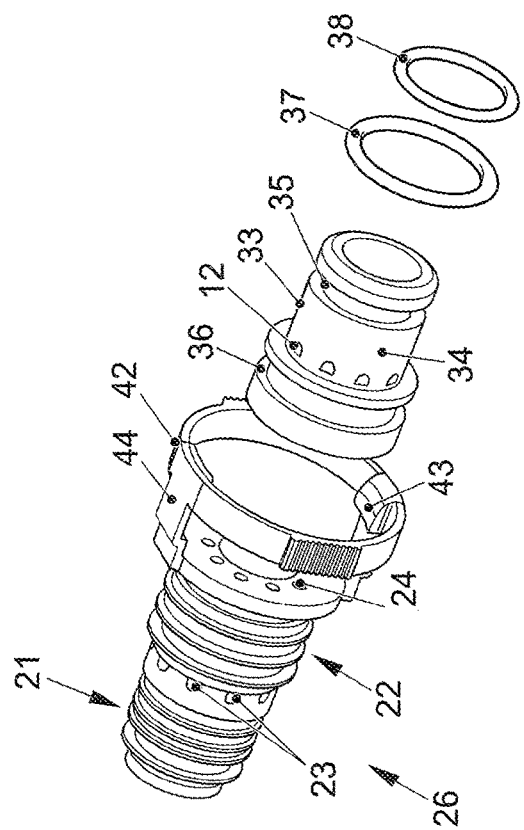
FIG. 4 shows a schematic exploded representation of the coupling part.

FIG. 1 and FIG. 4 are now discussed in greater detail below:

Component 26 is connected to another component 33, in which outer conduit 24 is further guided. Outer conduit 24 exits here on an outer circumferential surface 34, which is situated between two annular grooves 35, 36. O rings 37, 38 are disposed in each of annular grooves 35, 36. Outer circumferential surface 34 limits part of an annular space with an inner circumferential surface 39 of connecting piece 10. A diagnostic channel 40 runs from inner circumferential surface 39 within connecting piece 10, which, in turn, empties into another diagnostic channel 41 in exhaust gas turbocharger housing 4. O rings 37 38 in this case seal the annular space between outer circumferential surface 34 against the corresponding, abutting inner circumferential surfaces of connecting piece 10.

Coupling part 19 is screwed, in particular, to exhaust gas turbocharger housing 4. Coupling part 20 is connected to connecting piece 10 with the aid of a locking connection. For this purpose, coupling part 20 has an outer ring 42, on which at least one locking tab 43 is formed. Outer ring 42 is connected to the rest of the body via two arms 44. When outer ring 42 is now pushed onto connecting piece 10, locking tabs 43 are pushed over a holding contour 45 on the outer circumference of connecting piece 10, where they engage.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement for removing blow-by gases from a crankcase of an internal combustion engine, the blow-by gases being able to be supplied to an air intake system via a tube device, the tube device being connectable to a first component assigned to the air intake system and to a second component that is in fluid connection to the crankcase, the tube device comprising:
    a blow-by conduit; and
    a diagnostic conduit,
    wherein a spurious air flow is detectable via the diagnostic conduit when the tube device is not tightly connected or is not connected,
    wherein the tube device includes an outer tube and an inner tube, and
    wherein the tube device includes at least one coupling part having a first outer circumferential surface and a second outer circumferential surface, wherein the coupling part is at least partially inserted inside the inner tube and at least partially inserted inside the outer tube, such that an inner surface of the inner tube directly contacts and engages on the first outer circumferential surface of the coupling part, and an inner surface of the outer tube directly contacts and engages on the second outer circumferential surface of the coupling part, and wherein an inlet opening of the coupling part, provided between the first and second outer circumferential surfaces of the coupling part, empties into an outer conduit provided inside of the coupling part, the outer conduit being an extension of the diagnostic conduit.

2. The arrangement according to claim 1, wherein a first open end of the diagnostic conduit sealingly abuts the first component in a correctly mounted state of the tube device and a second open end of the diagnostic conduit sealingly abuts the second component in the correctly mounted state of the tube device.

3. The arrangement according to claim 2, wherein a sealing ring is disposed between an end face of the tube device and the first component at the first open end of the diagnostic conduit.

4. The arrangement according to claim 1, wherein the inner tube is used as the blow-by conduit, and an annular space between the outer tube and the inner tube is used as the diagnostic conduit.

5. The arrangement according to claim 1, wherein the tube device is connectable to an oil separator housing on one end via the second component, the oil separator housing being in fluid connection with an intake manifold, and wherein the oil separator housing has a diagnostic channel that is in fluid connection to the diagnostic conduit.

6. The arrangement according to claim 1, wherein the coupling part is connectable to the second component via a locking connection.

7. The arrangement according to claim 6, wherein at least one locking tab is formed on an outer ring of the coupling part, the at least one locking tab interacting with a holding contour formed on the outer circumferential surface of the second component.

8. The arrangement according to claim 1, wherein the coupling part has a cavity extending axially through a center thereof, the cavity forming an inner conduit that is fluidly separated from the outer conduit and wherein the inner conduit forms an extension of the blow-by conduit.

\* \* \* \* \*